US012768856B2

(12) United States Patent
Chen et al.

(10) Patent No.: US 12,768,856 B2
(45) Date of Patent: Oct. 20, 2026

(54) AUTOMATED INTERPRETATION SYSTEM FOR QUANTITATIVE AND QUALITATIVE ANALYSIS OF BIOCHIPS

(71) Applicant: GENE TARGET TECHNOLOGY CO., LTD., Kaohsiung (TW)

(72) Inventors: Yi-Fang Chen, Kaohsiung (TW); Suz-Kai Hsiung, Kaohsiung (TW); Chun-Wei Huang, Kaohsiung (TW); Yin-Lin Li, Kaohsiung (TW); Kao-Yuan Chang, Kaohsiung (TW)

(73) Assignee: GENE TARGET TECHNOLOGY CO., LTD., Kaohsiung (TW)

( * ) Notice: Subject to any disclaimer, the term of this patent is extended or adjusted under 35 U.S.C. 154(b) by 467 days.

(21) Appl. No.: 18/398,953

(22) Filed: Dec. 28, 2023

(65) Prior Publication Data

US 2025/0180593 A1 Jun. 5, 2025

(30) Foreign Application Priority Data

Dec. 1, 2023 (TW) ................................ 112146852

(51) Int. Cl.
*B01L 3/00* (2006.01)
*G01N 35/00* (2006.01)
*G01N 35/10* (2006.01)

(52) U.S. Cl.
CPC ... *G01N 35/1074* (2013.01); *G01N 35/00069* (2013.01); *G01N 2035/00425* (2013.01); *G01N 2035/00524* (2013.01)

(58) Field of Classification Search
None
See application file for complete search history.

(56) References Cited

U.S. PATENT DOCUMENTS

2021/0155978 A1* 5/2021 Tidd ...................... B01L 7/5255
2022/0333180 A1* 10/2022 Yang .................... C12Q 1/6804

FOREIGN PATENT DOCUMENTS

CN 101334402 B * 4/2013
CN 112300911 A * 2/2021 ........... C12Q 1/6844
CN 114317230 A * 4/2022

* cited by examiner

*Primary Examiner* — P. Kathryn Wright
(74) *Attorney, Agent, or Firm* — Muncy, Geissler, Olds & Lowe, P.C.

(57) ABSTRACT

The present invention provides an automated interpretation system for quantitative and qualitative analysis, which comprises a movable module, a multi-channel extraction module, an analysis and image capture module, a rejection unit and a processing module, wherein the processing module controls the movable module to move the multi-channel extraction module to one of the analysis and image capture module and the rejection unit, thereby achieving multi-channel subject extraction, and reducing manual misjudgment and working hours.

5 Claims, 4 Drawing Sheets

AUTOMATED INTERPRETATION SYSTEM FOR QUANTITATIVE AND QUALITATIVE ANALYSIS OF BIOCHIPS

FIELD OF THE INVENTION

The present invention relates to an automated interpretation system for quantitative and qualitative analysis and interpretation of samples by biochips.

BACKGROUND OF THE INVENTION

With the development of modern medical technology and clinical needs, many diagnostic methods or judgments gradually require quantitative analysis of target genes. However, when performing qualitative and quantitative analysis on the target genes, it is often desirable to increase the number of nucleic acid detection target objects in a relatively short period of time, so that a small number of nucleic acid detection target objects in a detection body can be increased to the number that can be detected. Thus, it facilitates the subsequent detection of the presence of nucleic acid detection target objects to be detected, and even determine the number thereof, thereby reducing the waiting time for detection.

Furthermore, when a user manually transmits the subject between the devices with different test functions to perform a chromogenic reaction, not only damage may occur due to poor temperature control of the subject, but also unnecessary test errors may occur during the manual operation. Furthermore, when the subject is compared in chromogenic generation with the biochip, if the number of the subject is too large, manually performing the chromogenic comparison is prone to misjudge due to personnel exhaustion, or when the subject is manually extracted, the liquid volume of the extracted subject is insufficient, resulting in the problem that the biochip cannot give chromogenic generation. It would be desirable to provide a method for automatically extracting a solution volume of a desired liquid from a subject for chromogenic reaction with the biochip, and automatically compare and interpret chromogenic images of the biochip, thereby ameliorating the disadvantages of manual manipulation.

SUMMARY OF THE INVENTION

It is an object of the present invention to provide an automated interpretation system for quantitative and qualitative analysis which can automatically compare and interpret the chromogenic image results of biochips by automatically extracting samples of a required solution volume for chromogenic reaction with the biochips. In order to achieve the above-mentioned object, the present invention provides an automated interpretation system for quantitative and qualitative analysis, which comprises a movable module, a multi-channel extraction module, an analysis and image capture module, a rejection unit and a processing module, wherein the movable module comprises a first movable unit, a second movable unit and a third movable unit; the first movable unit, the second movable unit and the third movable unit respectively move in different directions; the multi-channel extraction module comprises a body, a plurality of extraction units, a plurality of extraction pipes and a plurality of conversion units, wherein the body is assembled with at least one of the first movable unit, the second movable unit and the third movable unit; the body accommodates the plurality of extraction units therein; one end of each of the extraction pipes is assembled with one of the extraction units, and the other end of each of the extraction pipes is assembled with one of the conversion units; the analysis and image capture module has a shelf, a plurality of shaking bearing units, a shaking driving unit, a cover unit and an image sensing unit, wherein the shelf accommodates and is assembled with the plurality of shaking bearing units; the shaking driving unit is assembled at one side of the plurality of shaking bearing units and drives and controls the plurality of shaking bearing units assembled with the shelf; the cover unit and the image sensing unit are respectively assembled at one side of the plurality of shaking bearing units; the rejection unit is adjacent to the analysis and image capture module, wherein the rejection unit has a stop plate and a plurality of stop grooves formed on the stop plate; and the processing module is electrically connected to the movable module, the plurality of extraction units and the analysis and image capture module, respectively; wherein the movable module is arranged on the peripheral side of arranged around the analysis and image capture module and the rejection unit; and the processing module controls the movable module to move the multi-channel extraction module to one of the analysis and image capture module and the rejection unit.

Further, the first movable unit moves along a first direction and has at least one first guide rod and at least one first driver; the second movable unit moves along a second direction and has at least one second guide rod and at least one second driver; the third movable unit moves along a third direction and has at least one third guide rod and at least one third driver; the first driver, the second driver and the third driver are electrically connected to the processing module; and the first direction, the second direction and the third direction intersect each other.

Further, the plurality of conversion units each has a combination part, a channel part and a conversion part; one end of each of the combination parts is assembled at the other end of the extraction pipe assembled with the extraction unit; the conversion part is tapered from the ends of the adjacent combination parts along the axial direction of the conversion units towards the other end; and each of the channel parts passes through the conversion unit from one end of the combination part connected to the extraction pipe and communicates through the conversion part at the other end.

Further, the cover unit comprises a cover driver and a shade; and the cover driver is electrically connected to the processing module, and controls the pivotally connected shade to cover the plurality of shaking bearing units.

Further, a storage unit is arranged on the peripheral side of the rejection unit, the storage unit being adjacent to the analysis and image capture module and having a plurality of storage grooves, wherein the plurality of storage grooves have different sizes.

Further, a collector is arranged on a lower side of the stop plate. Further, the image sensing unit has a fourth driver and at least one image sensor; and the fourth driver controls the axial movement of the image sensor assembled along the plurality of shaking bearing units.

Further, the plurality of shaking bearing units are each provided with a temperature control unit; and at least one waste liquid collection unit is arranged below the temperature control unit.

The system for quantitative and qualitative analysis and automated interpretation of the present invention controls the movable module by the processing module to cause the first movable unit, the second movable unit and the third movable unit to move the multi-channel extraction module to a designated position, and cause the plurality of extraction units to each tightly fit a tip of the micropipette corresponding to a required solution volume by means of the plurality of extraction pipes assembled and the plurality of conversion units assembled at the other end of the plurality of extraction pipes. The subject extracted by the micropipette is displaced to the analysis and image capture module, so that the subject reacts with the biochip. Then, the image sensing unit performs image capture on the chromogenic result of the reaction between the biochip and the subject, and performs comparison analysis and interpretation on the intercepted image data, so that not only the artificial misjudgment may be reduced but also the working in hours may be reduced.

DETAILED DESCRIPTION OF THE PREFERRED EMBODIMENTS

Figure 1:
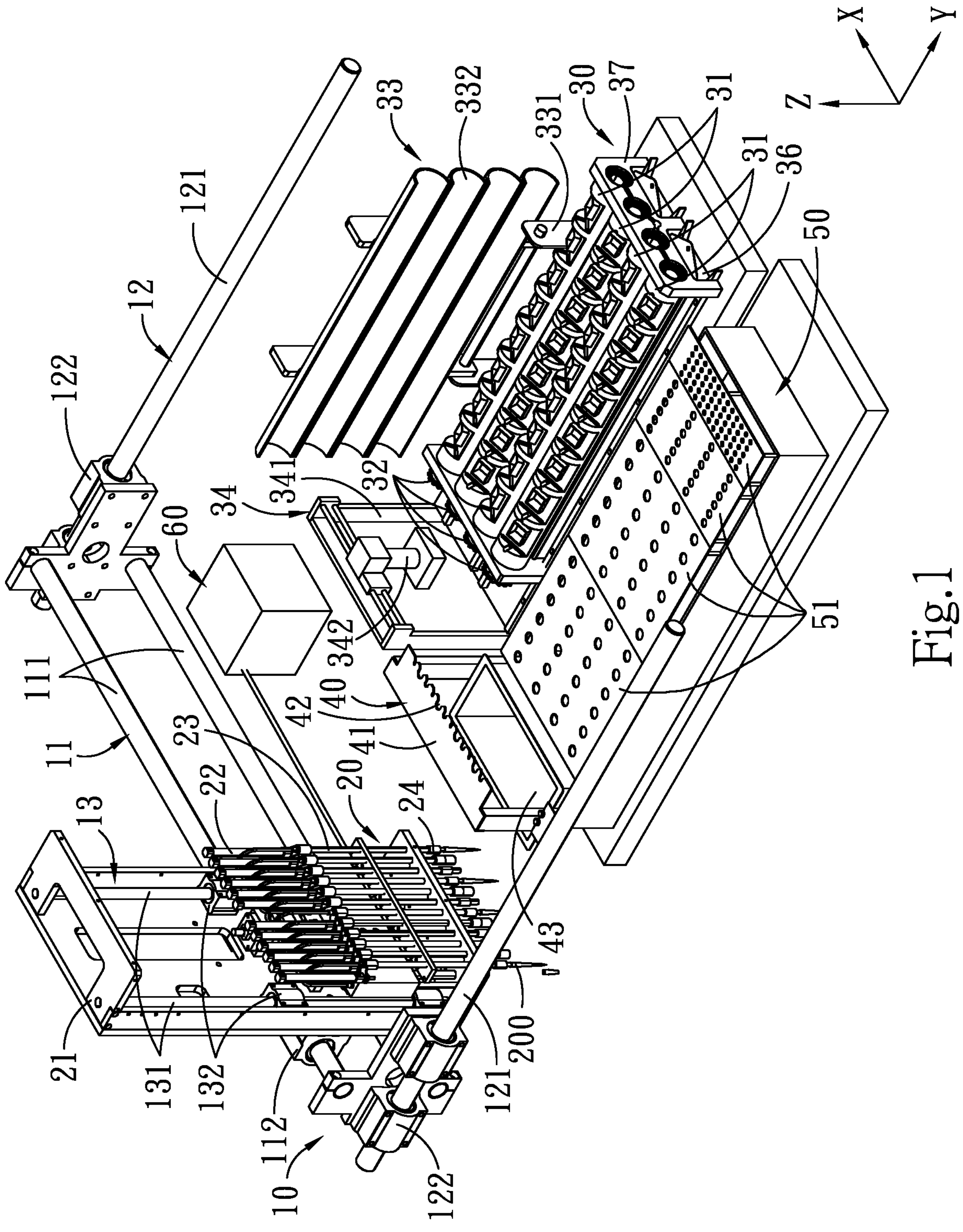
FIG. 1 is a schematic perspective view of an automated interpretation system for quantitative and qualitative analysis of a biochip according to the present invention.

The technical features and the mode of operation of this application are described below by giving preferred embodiments, together with accompanying drawings, in order for examination and reference. Furthermore, the drawings in the present invention are not necessarily to scale for ease of illustration. The scale in the drawings is not intended to limit the scope of the present disclosure.

With regard to the technology of the present invention, as shown in FIG. 1, FIG. 2, FIG. 3, and FIG. 4, the present invention provides an automated interpretation system for quantitative and qualitative analysis of biochips, which is used to perform quantitative and qualitative analysis and automated interpretation of biological samples, which mainly comprises a movable module 10, a multi-channel extraction module 20, an analysis and image capture module 30, a rejection unit 40, a storage unit 50 and a processing module 60.

The movable module 10 comprises a first movable unit 11 moving in a first direction X, a second movable unit 12 moving in a second direction Y and a third movable unit 13 moving in a third direction Z. The first movable unit 11 comprises two first guide rods 111 and two first drivers 112. The second movable unit 12 comprises two second guide rods 121 and two second drivers 122. The third movable unit 13 comprises two third guide rods 131 and two third drivers 132. The first direction X, the second direction Y and the third direction Z intersect with each other.

Figure 4:
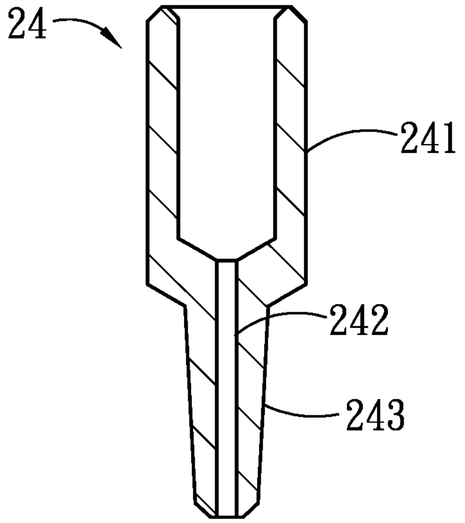
FIG. 4 is a schematic cross-sectional view of a conversion unit of the automated interpretation system for quantitative and qualitative analysis of the biochip according to the present invention.

The multi-channel extraction module 20 comprises a body 21, a plurality of extraction units 22, a plurality of extraction pipes 23 and a plurality of conversion units 24. The body 21 is assembled with at least one of the first movable unit 11, the second movable unit 12 and the third movable unit 13. The body 21 of the present embodiment is assembled with the first movable unit 11 and the third movable unit 13. The body 21 accommodates the plurality of extraction units 22 therein. One end of each of the plurality of extraction pipes 23 is assembled with one of the plurality of extraction units 22. The other end of each of the plurality of extraction pipes 23 is assembled with one of the plurality of conversion units 24. As shown in FIG. 4, each of the plurality of conversion units 24 comprises a combination part 241, a channel part 242, and a conversion part 243. One end of each of combination parts 241 is assembled at one end of each of the plurality of extraction pipe 23 opposite to the one end assembled with each of the plurality of extraction unit 22. One end of each of conversion parts 243 connected to each of the combination parts is tapered towards the other end of each of the combination parts 241 in an axial direction, and different sizes of the conversion parts 243 are in combination with different volumes of micropipettes 200. The plurality of conversion units 24 in the present embodiment provide the conversion parts 243 in three sizes. In each of conversion units 24, the channel parts 242 is disposed to pass through the conversion unit 24 from one end of the combination parts 241 connected to the extraction pipe 23 to one end of the conversion parts 243 opposite to that. The plurality of conversion units 24 also have the conversion parts 243 in four sizes, but are not limited thereto.

Figure 2:
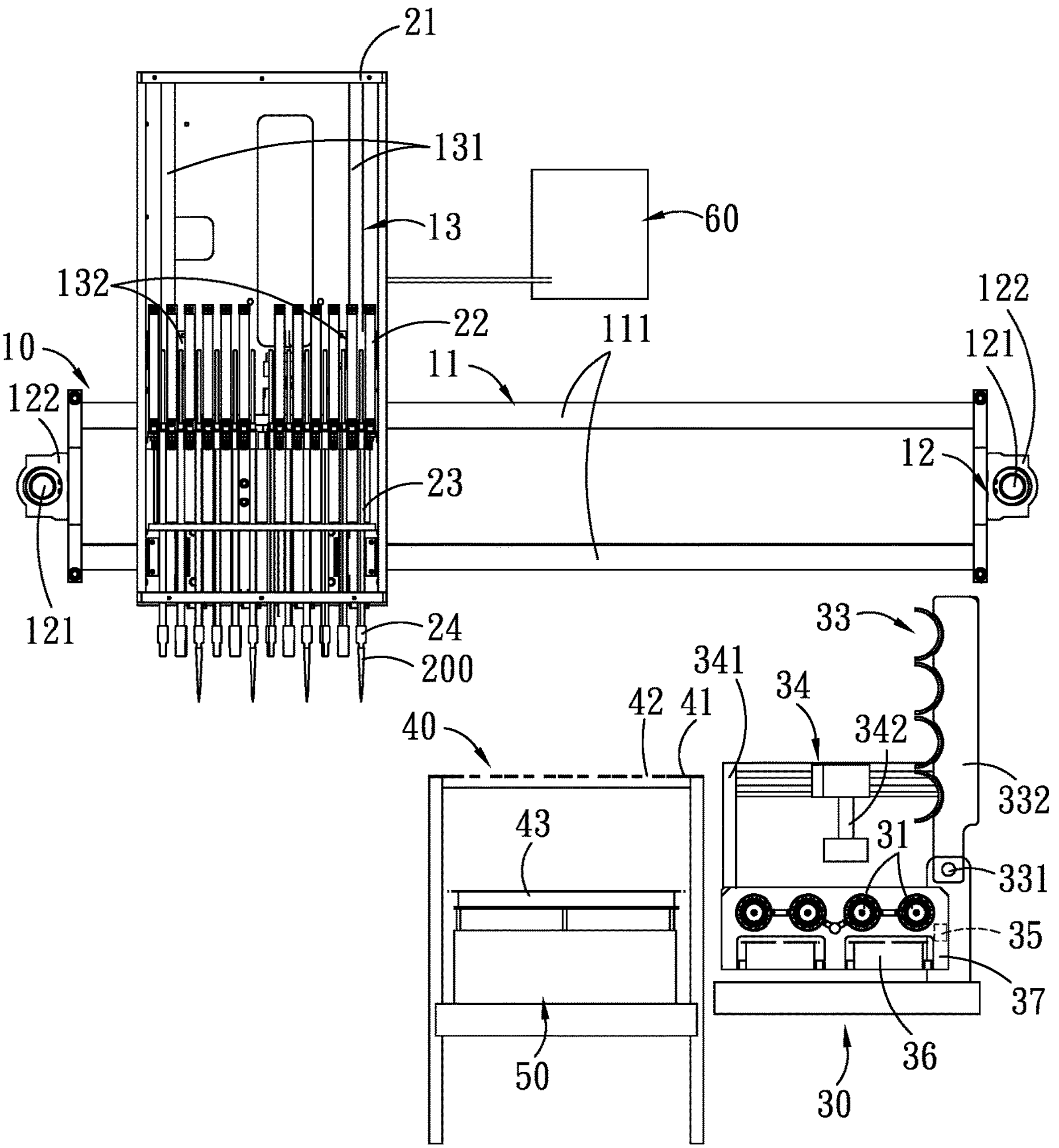
FIG. 2 is a side view of the automated interpretation system for quantitative and qualitative analysis of the biochip according to the present invention.
Figure 3:
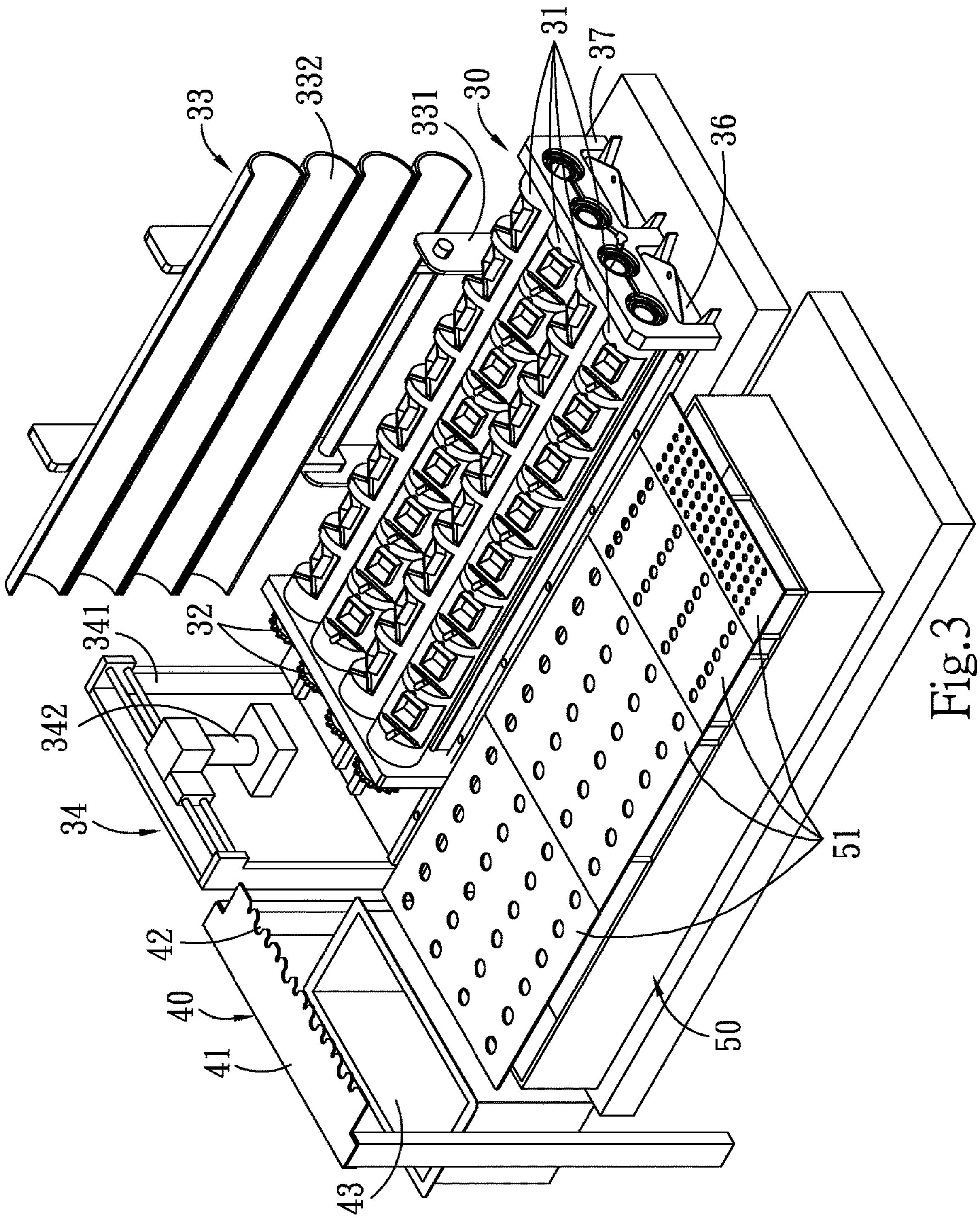
FIG. 3 is a partially schematic perspective view of an analysis and image capture module, a rejection unit and a storage unit of the automated interpretation system for quantitative and qualitative analysis of the biochip according to the present invention.

The analysis and image capture module 30 comprises a plurality of shaking bearing units 31, a shaking driving unit 32, a cover unit 33, an image sensing unit 34, a plurality of temperature control units 35, a plurality of waste liquid collection units 36 and a shelf 37. Referring to FIG. 1, FIG. 2, and FIG. 3, the shelf 37 is equipped and assembled with the plurality of shaking bearing units 31, and the shaking driving unit 32 is assembled at one side of the plurality of shaking bearing units 31 to drive and control the plurality of shaking bearing units 31 assembled with the shelf 37. The cover unit 33 and the image sensing unit 34 are respectively arranged on one side of the plurality of shaking bearing units 31, and each of the plurality of shaking bearing units is provided with one of the plurality of temperature control units 35. The waste liquid collection unit 36 is arranged below the temperature control unit 35. The image sensing unit 34 comprises a fourth driver 341 and an image sensor 342, and the fourth driver 341 controls the image sensor 342 assembled to move in an axial direction along the plurality of shaking bearing units 31, so that the image sensor 342 on the fourth driver 341 is used for sensing and intercepting an image of chromogenic reaction from samples and the biochips placed on the plurality of shaking bearing units 31. The image sensor 342 in this embodiment may be a CCD (charge-coupled device) sensing unit or an optical sensing unit, etc. A user may set up the image sensor 342 required for sensing general images, sensing images with specific wavelengths, or sensing chromogenic images with specific chromogenic in demand, so that the chromogenic image of the biochips can be sensed by wavelengths such as fluorescence or luminescence. The image sensing unit 34 may also be provided with a plurality of image sensors 342 for sensing different wavelengths but is not limited hereto. In addition, the cover unit 33 includes a cover driver 331 and a shade 332, and the cover driver 331 controls the shade 332 pivotally connected thereof to cover the plurality of shaking bearing units 31.

The rejection unit 40 is adjacent to the analysis and image capture module 30. The rejection unit 40 comprises a stop plate 41 and a plurality of stop grooves 42 formed on the stop plate 41, and the rejection unit 40 is provided with a collector 43 on a lower side of the stop plate 41.

The storage unit 50 is adjacent to the rejection unit 40 and the analysis and image capture module 30. The storage unit 50 comprises a plurality of storage grooves 51 with different sizes. The plurality of storage grooves 51 in this embodiment has three sizes to store three micropipettes 200 with different solution volumes, and the three micropipettes 200 extract the samples with different solution volumes.

The processing module 60 is electrically connected to the two first drivers 112, the two second drivers 122, the two third drivers 132 of the movable module 10, the plurality of extraction units 22 of the multi-channel extraction module 20, and the shaking driving unit 32, the cover driver 331, the fourth driver 341 and the plurality of temperature control units 35 of the analysis and image capture module 30, respectively. The processing module 60 stores chromogenic image data of the biochips reacting with a standard.

The movable module 10 is arranged on peripheral sides of the analysis and image capture module 30 and the rejection unit 40. The processing module 60 controls the movable module 10 to move the multi-channel extraction module 20 so that an extracted sample with a solution volume required is moved to one of the analysis and image capture module 30 and the rejection unit 40. In addition, the processing module 60 transmits chromogenic images of the biochips sensed and intercepted by the image sensor 342 to a cloud database via the Internet, and then the cloud database provides the chromogenic images of the biochips sensed and intercepted to a relevant servo computer for comparing with a chromogenic image data of a corresponding standard stored, and a comparison result is stored in the cloud database for subsequent processing.

With reference again to FIG. 1, FIG. 2, FIG. 3, and FIG. 4, the user inputs relevant test and relevant test comparison program data in the processing module 60, the processing module 60 controls the multi-channel extraction module 20 to move to the storage unit 50 by the movable module 10, controls the plurality of extraction units 22 corresponded to extend the plurality of extraction pipes 23, thereby the plurality of conversion units 24 combine with the micropipettes 200 of a required solution volume, and after that, the movable module 10 moves the multi-channel extraction module 20 to the storage unit 50 accommodating the samples. The processing module 60 controls the plurality of extraction units 22 to make the micropipettes 200 suck the samples with the required solution volume, and transfers the samples sucked to the analysis and image capture module 30 to react with corresponding biochips placed therein, namely, allowing nucleic acids of the samples to react with probes on the biochips on the plurality of shaking bearing units 31, and then remove unreacted and uncombined parts as well as cover excess pore sites to avoid non-specific binding of the samples. After the probes of the biochips combine with the nucleic acids of the samples, the samples react with the biochips in a chromogenic reaction. The image sensing unit 34 intercepts an image of a chromogenic reaction result of the biochips to the samples. The processing module 60 provides the image intercepted to the cloud database corresponded, so that the servo computer corresponded obtains an image data from the cloud database to compare and interpret the image data of the standard.

In detail, the processing module 60 selects a corresponding micropipette 200 with a required solution volume at the storage unit 50 according to the sample with the required solution volume during a test, and controls the plurality of extraction units 22 to make the plurality of extraction pipes 23 move along the third direction Z, and the conversion parts 243 of the plurality of conversion units 24 combined with the plurality of extraction pipes 23 are tightly fitted to selected micropipettes 200 one by one, and the body 21 is moved to make the plurality of extraction units 22 extract the sample with the required solution volume by the micropipette 200. With reference to FIG. 4, the plurality of extraction units 22 extract air in the micropipette 200 along the channel part 242 of each of the plurality of conversion units 24 to the plurality of extraction pipes 23, and the micropipette 200 extracts the sample with the required solution volume from a centrifuge tube to a chromogenic box of the plurality of shaking bearing units 31 through principles of vacuum.

Furthermore, the multi-channel extraction module 20 rejects used micropipettes 200 through the rejection unit 40, namely, the used micropipettes 200 tightly fitted to the conversion parts 243 are clamped against the plurality of stop grooves 42 corresponded on the stop plate 41, and then the plurality of extraction units 22 are moved in the third direction Z, so that the used micropipettes 200 are removed from the conversion parts 243 tightly fitted, and the used micropipettes 200 fall into the collector 43 provided below. Furthermore, the processing module 60 controls the shaking driving unit 32 of the analysis and image capture module 30, wherein the shaking driving unit 32 drives the plurality of shaking bearing units 31 to shake side-to-side. The processing module 60 controls the plurality of temperature control units 35 to provide temperatures required by the reaction of the samples and the biochips when the sample is placed on the plurality of shaking bearing units 31, and after the samples placed on the plurality of shaking bearing units 31 reacting with the biochips placed therein in the chromogenic box are completed, the fourth driver 341 of the image sensing unit 34 moves along the second direction Y so that the image sensor 342 intercepts the chromogenic results of the biochips one by one, and the processing module 60 interprets the chromogenic results received. Thus, the automated interpretation system for quantitative and qualitative analysis of biochips according to the present invention performs tests and interpretation procedures in an automated manner, reducing troubles of human tests and inaccurate interpretation.

In summary, the system for quantitative and qualitative analysis and automated interpretation of the present invention controls the movable module 10 and the multi-channel extraction module 20 move to a designated position by the processing module 60, each of the plurality of conversion units 24 are assembled with one of the micropipette 200 with the required solution volume, and the plurality of extraction units 22 and the plurality of extraction pipes 23 extract the required solution volume, the samples extracted by the micropipettes 200 are displaced to the analysis and image capture module 30, so that the samples react with the biochips. Then, the image sensing unit 34 intercepts image from the chromogenic result of the reaction between the biochips and the samples and performs comparison analysis and interpretation on the image data intercepted, so that not only artificial misjudgment may be reduced but also working hours may be reduced.

What is claimed is:

1. An automated interpretation system for quantitative and qualitative analysis of biochips, configured to perform a quantitative analysis, a qualitative analysis and an automatic interpretation on biological samples, comprising:

a movable module, comprising
a first movable unit,
a second movable unit and
a third movable unit,
wherein the first movable unit, the second movable unit and the third movable unit respectively move in different directions;
a multi-channel extraction module comprising
a body,
a plurality of extraction units,
a plurality of extraction pipes and
a plurality of conversion units,
wherein the body is assembled with at least one of the first movable unit, the second movable unit and the third movable unit;
wherein the body accommodates the plurality of extraction units therein;
one end of each of the plurality of extraction pipes is assembled with one of the plurality of extraction units, and the other end of each of the plurality of extraction pipes is assembled with one of the plurality of conversion units;
an analysis and image capture module, comprising
a shelf,
a plurality of shaking bearing units,
a shaking driving unit,
a cover unit, and
an image sensing unit,
wherein the shelf is equipped and assembled with the plurality of shaking bearing units;
the shaking driving unit is assembled at one side of the plurality of shaking bearing units to drive and control the plurality of shaking bearing units assembled with the shelf;
the cover unit and the image sensing unit are respectively assembled on one side of the plurality of shaking bearing units;
a rejection unit, adjacent to the analysis and image capture module, wherein the rejection unit comprises
a stop plate and
a plurality of stop grooves formed on the stop plate;
a processing module, electrically connected to the movable module, the plurality of extraction units and the analysis and image capture module, respectively;
wherein the movable module is arranged on peripheral sides of the analysis and image capture module and the rejection unit; and
the processing module controls the movable module to move the multi-channel extraction module to one of the analysis and image capture module and the rejection unit;
the first movable unit moves along a first direction and comprises
at least one first guide rod and at least one first driver;
the second movable unit moves along a second direction and comprises
at least one second guide rod and
at least one second driver;
the third movable unit moves along a third direction and comprises
at least one third guide rod and
at least one third driver;
the first driver, the second driver and the third driver are electrically connected to the processing module;
the first direction, the second direction, and the third direction intersect with each other,
each of the plurality of conversion units comprises
a combination part,
a channel part and
a conversion part;
wherein one end of the combination part is assembled at one end of each of the plurality of extraction pipes opposite to the end assembled with each of the plurality of extraction units;
one end of the conversion part connected to the combination part is tapered towards the other end of the combination part in an axial direction;
wherein the channel part is disposed to pass through from one end of the combination part and connected to one of the plurality of extraction pipes,
wherein the cover unit comprises;
a cover driver,
a shade, and
wherein the cover driver is electrically connected to the processing module, and controls the shade pivotally connected thereof to cover the plurality of shaking bearing units.

2. The automated interpretation system for quantitative and qualitative analysis of the biochips according to claim 1, wherein a storage unit is arranged on peripheral sides of the rejection unit, the storage unit is adjacent to the analysis and image capture module and comprises a plurality of storage grooves with different sizes.

3. The automated interpretation system for quantitative and qualitative analysis of the biochips according to claim 1, wherein a collector is arranged on a lower side of the stop plate.

4. The automated interpretation system for quantitative and qualitative analysis of the biochips according to claim 1, wherein the image sensing unit comprises a fourth driver and at least one image sensor, and the fourth driver controls the image sensor assembled to move in an axial direction along the plurality of shaking bearing units.

5. The automated interpretation system for quantitative and qualitative analysis of the biochips according to claim 1, wherein each of the plurality of shaking bearing units is provided with one of a plurality of temperature control units, and a plurality of waste liquid collection units are arranged below the plurality of temperature control units.

* * * * *